United States Patent Office 2,911,785
Patented Nov. 10, 1959

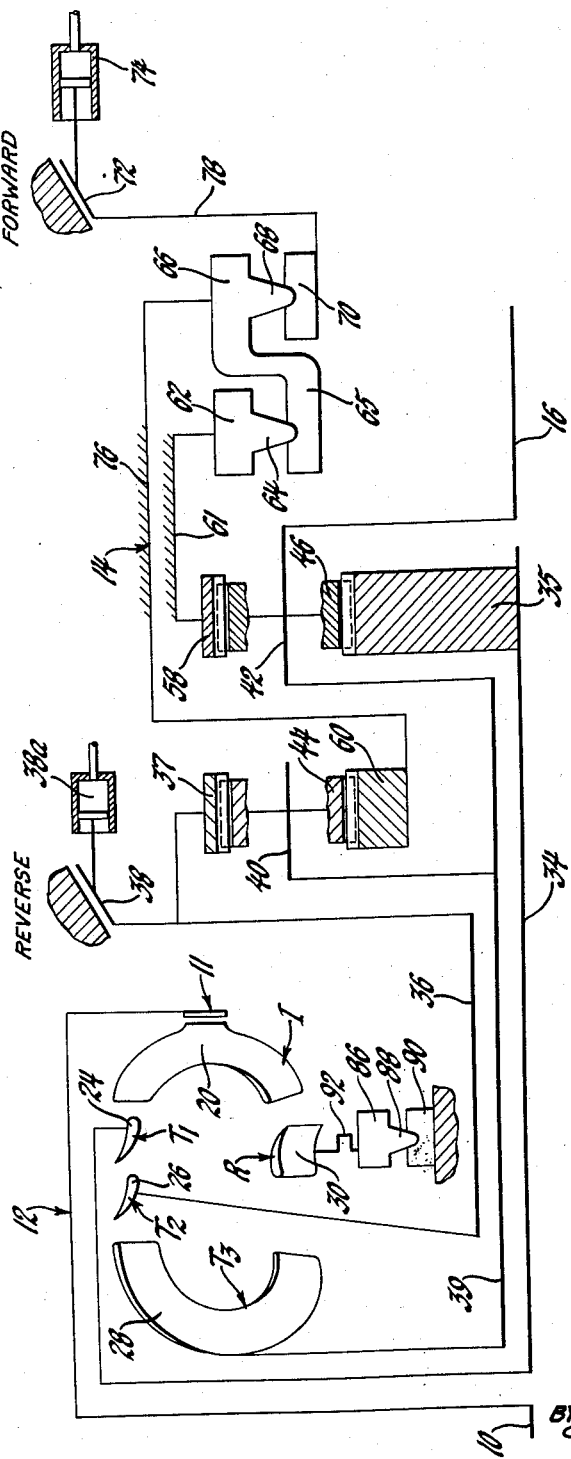

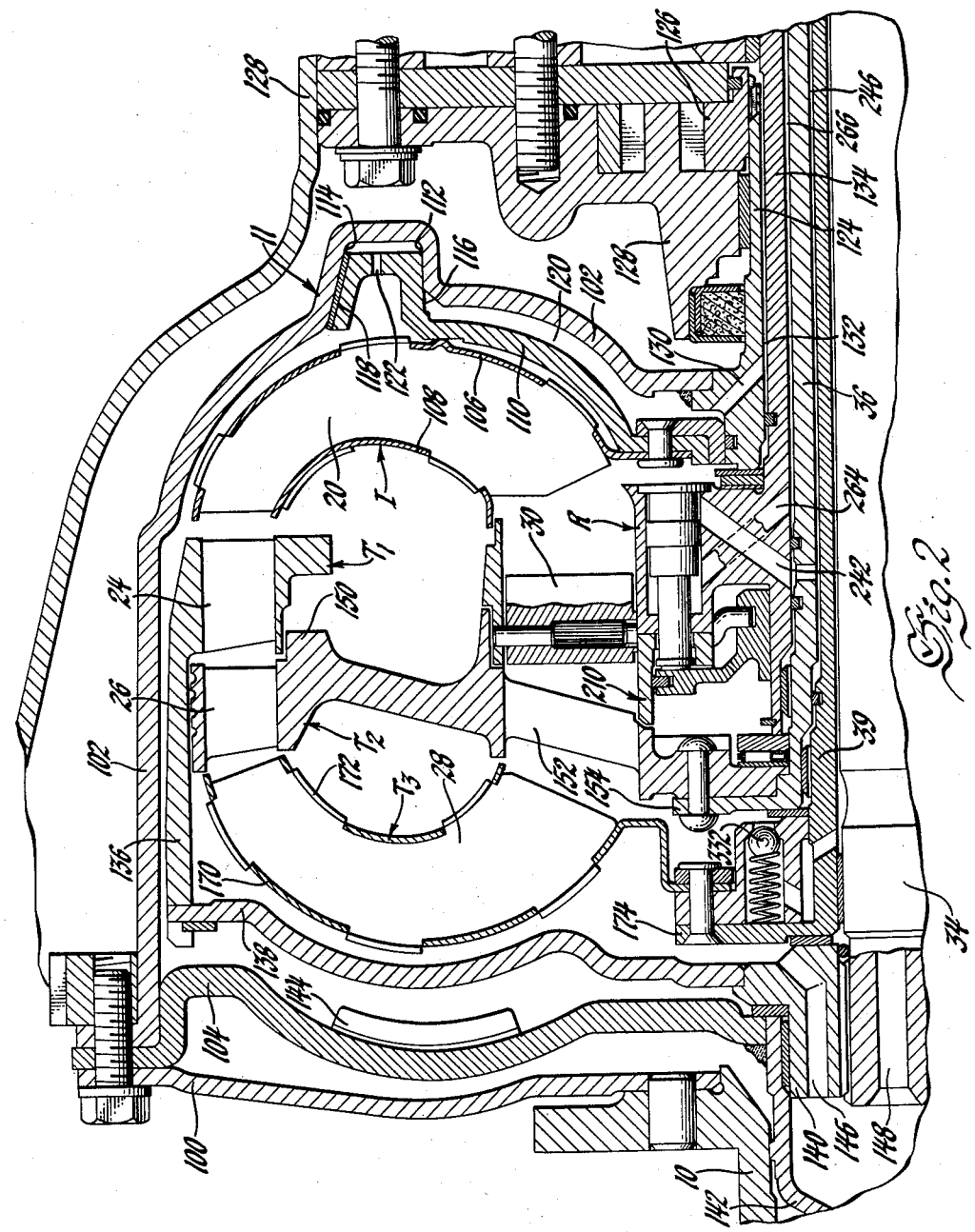

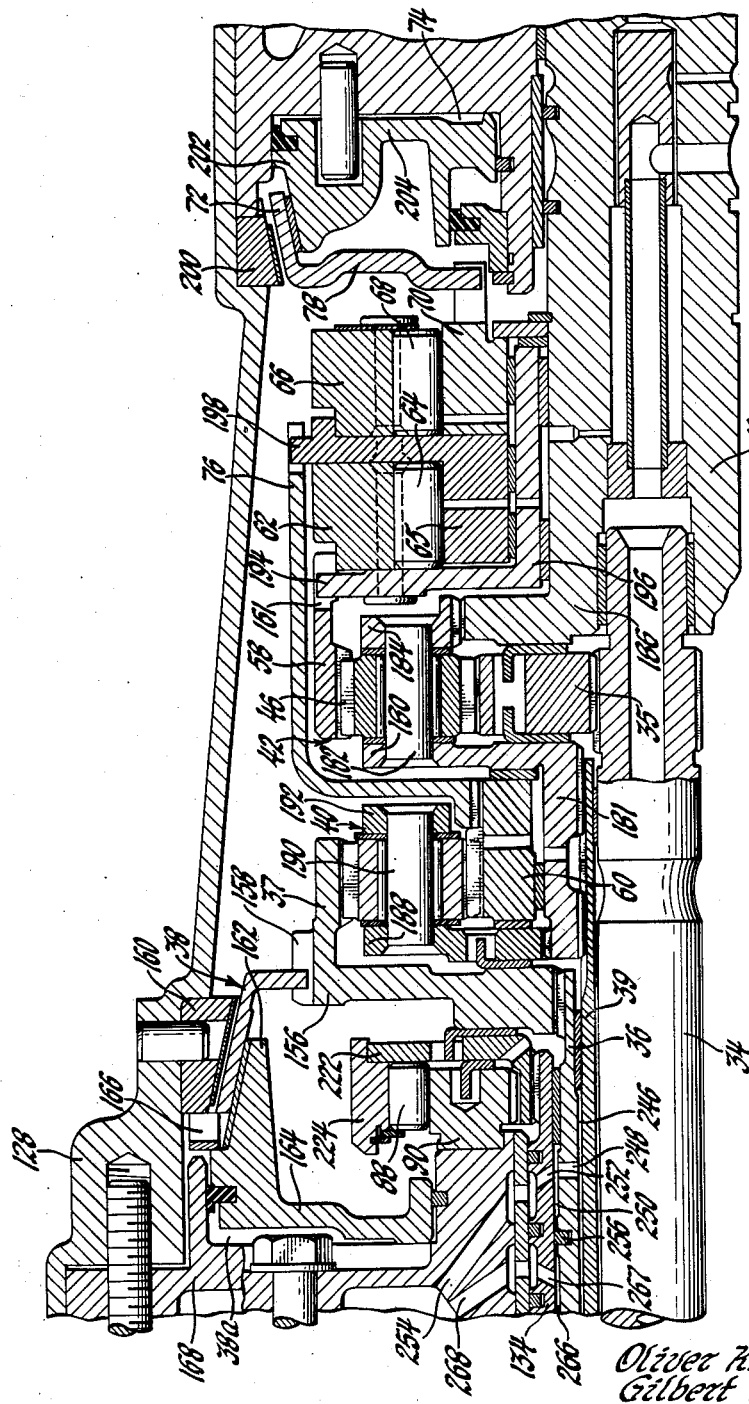

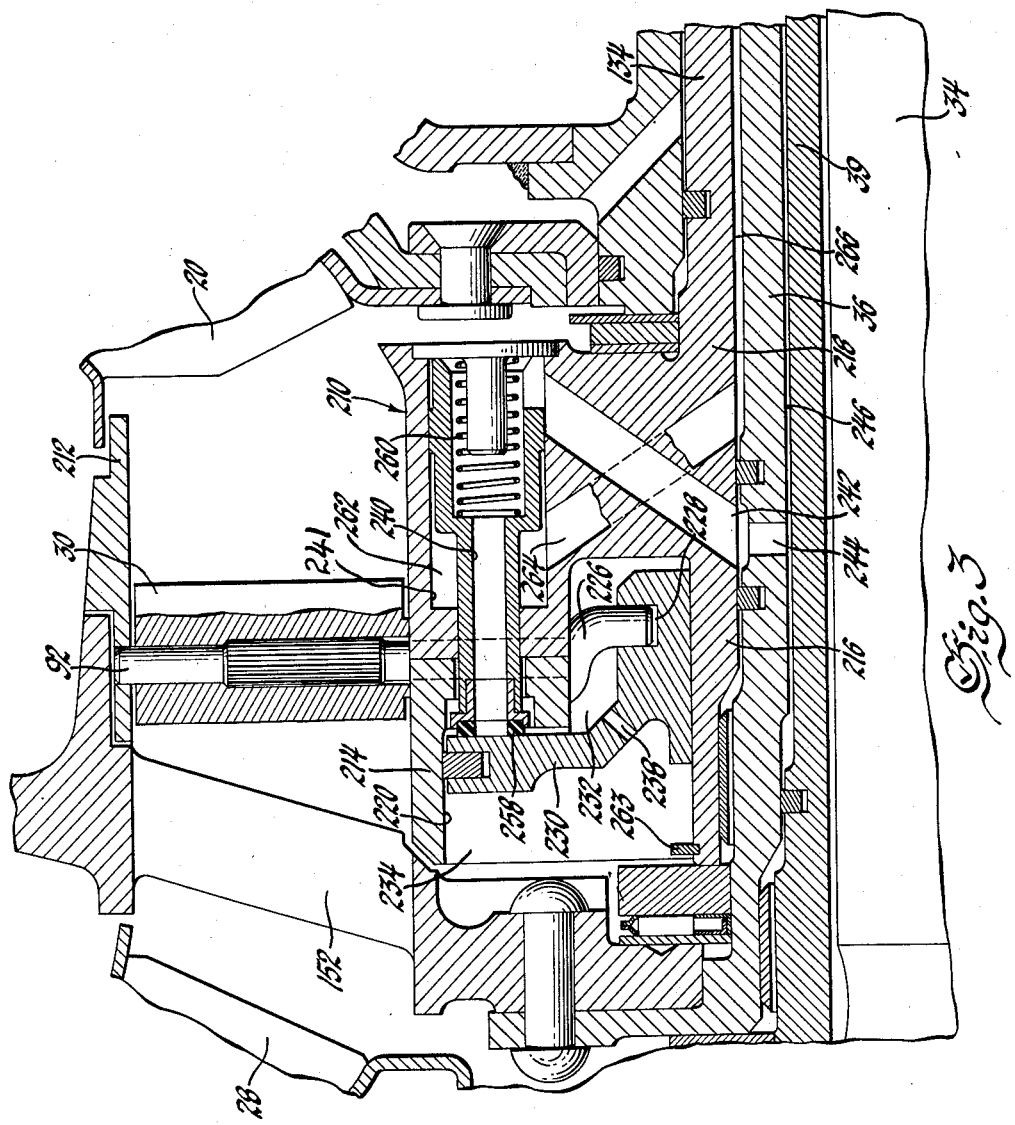

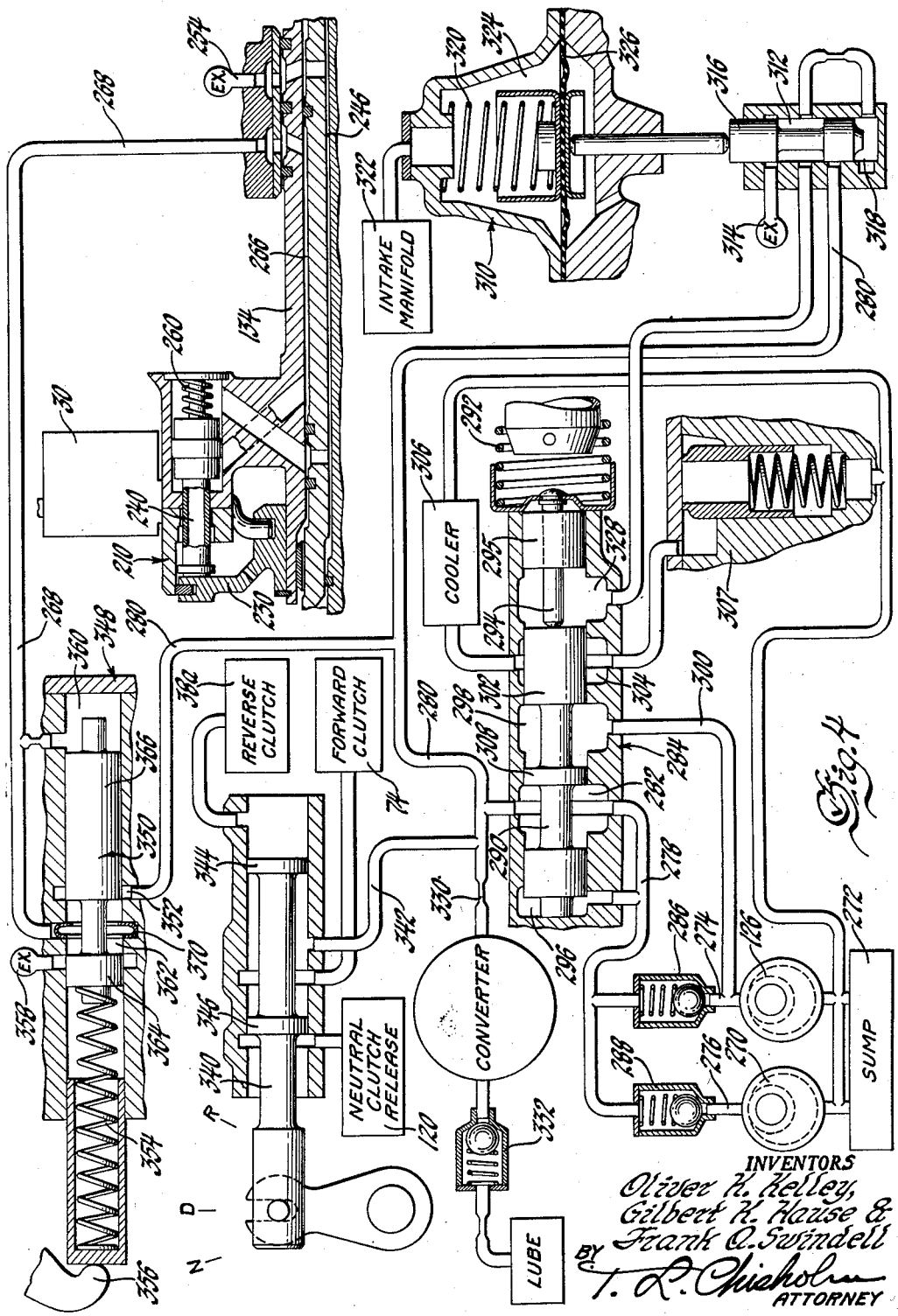

2,911,785

REACTOR BLADE PITCH CONTROL OF A HYDRODYNAMIC TORQUE CONVERTER

Oliver K. Kelley, Bloomfield Hills, Gilbert K. Hause, Franklin, and Frank A. Swindell, Detroit, Mich., assignors to General Motors Corporation, Detroit, Mich., a corporation of Delaware Application March 6, 1957, Serial No. 644,345

14 Claims. (Cl. 60—12)

This invention relates to hydrodynamic torque transmitting device of the kind in which a bladed impeller which may be driven by an engine circulates liquid in a closed path through one or more bladed turbines to transmit torque to an output shaft through the kinetic energy of the moving liquid. The device may also have a bladed reaction member or a guide wheel. The invention is particularly concerned with controlling adjustable blades in one of the bladed members of such a device.

In known hydrodynamic torque transmitting devices in general and especially those which multiply torque (called torque converters) the blades of one or more of the bladed members, such as turbines or reaction members, have been made adjustable so as to vary the torque transmitted from the impeller to the output shaft. In torque converters adjustability increases the range of torque multiplication and where the torque converter is driven by an internal combustion engine this makes possible higher engine speeds with a given load than is possible with non-adjustable blades and hence increases the power output from a given system.

One of the objects of this invention is to provide improved and simplified and reliable arrangements for varying the position of an adjusting member which controls the torque in a torque transmitting device. The invention is especially though not exclusively suitable for torque converters and it is illustrated herein as embodied in a torque converter. However, the invention is not limited to torque converters and some of its features are applicable to hydrodynamic torque transmitting devices generally. Also, the invention is particularly, though not exclusively, adapted to torque transmitting devices used in transmissions in automobiles and the invention is shown herein as so applied but only as an example.

One of the more specific objects of the invention is to provide improved arrangement for varying the torque ratio or torque multiplication of a torque converter continuously according to the load or torque demand on the power plant. This may be done for example by positioning the blades of a reaction member automatically according to the throttle opening of the engine which drives the device. These and other objects and advantages of the invention will be apparent in the following description and in the accompanying drawings.

In the drawings:

Fig. 1 is a diagrammatic illustration of a transmission embodying one form of the invention, being one-half of a longitudinal section which is symmetrical about the axis of the transmission, Figs. 2 and 2A collectively form one-half of a symmetrical, longitudinal section of the actual structure of a transmission embodying one form of the invention; Fig. 2 being a section of a torque converter and Fig. 2A being a section of planetary gearing connecting the torque converter to the output shaft, Fig. 3 is an enlarged section taken as Fig. 1 is taken of a reaction blade control device, and Fig. 4 is a hydraulic diagram of a control system for the transmission illustrated in Figs. 1–3.

GENERAL ARRANGEMENT

Referring to Fig. 1 the transmission includes an input shaft 10, such as the crank shaft of an internal combustion engine, which can be connected by a neutral clutch 11 to drive a hydrodynamic torque converter 12 which in turn drives planetary reduction gearing, generally denoted by 14, connected to a final drive shaft 16, such as the propeller shaft of an automobile. The torque converter includes a pump or impeller I of generally known form, represented diagrammatically in Fig. 1 by a single blade 20 which when connected to the engine by the neutral clutch 11 circulates working liquid in a closed toroidal path which includes a first turbine $T_1$ represented by the single blade 24 of known form, a second turbine $T_2$ represented by blade 26, a third turbine $T_3$ represented by blade 28 and a reaction member R represented by blade 30.

The first turbine $T_1$ is connected by a shaft 34 to drive rear input sun gear 35 of the planetary gearing 14. The second turbine $T_2$ is connected by a shaft 36 to drive front input ring gear 37 which can also be held fast by a ground clutch or brake 38 which can be engaged by any suitable means such as a hydraulic cylinder 38a to effect reverse drive, as will be explained. The third turbine $T_3$ is connected by shaft 39 to drive front and rear carriers 40 and 42 which, respectively, support front planetary pinions 44 meshing with the front input ring gear 37 and rear planetary pinions 46 which mesh with the rear input sun gear 35. The shaft 39 is the principal drive shaft of the transmission and is connected through the carrier 42 to the final drive shaft 16. A reaction ring gear 58 meshing with planet gears 46 completes the rear planetary unit of the reduction gear and a reaction sun gear 60 meshing with the front planet pinions 44 completes the front planetary unit.

The rear reaction gear 58 is connected by a drum 61 to a one-way clutch or ratchet device symbolically represented by an outer member 62 which can rotate about the center line of shaft 16 and toward the eye of the observe but is prevented from rotating in the opposite sense by a ratchet element 64 secured to the outer member 62 and overlapping an inner member 65 which may be fixed. This schematically represents that the ratchet element 64 and the member 62 can move toward the eye of the observer out of the plane of the paper but cannot move away from the eye of the observer because they are blocked by the member 65. The members 62 and 65 represent outer and inner races, respectively, of a freewheeler. This inner race 65 is integral with an outer member 66 of a second similar one-way clutch rotatable toward the eye of the observer but prevented from rotating in the opposite sense by ratchet element 68 secured to member 66 representing an outer race and overlapping a member 70 representing an inner race. The inner race can be held fast by a ground clutch or brake 72 which can be engaged by any suitable hydraulic cylinder 74. The races 66 and 65 are connected to the front reaction sun gear 60 by a drum 76.

The term clutch is used generically herein to mean any device which can be engaged to prevent rotation between two members which otherwise are relatively rotatable. If both members are rotatable absolutely, engagement of the clutch causes them to rotate together so that one member may drive the other. In this case the generic clutch is also specifically a drive clutch. If one of the members is fixed the engagement of the clutch holds the other member fast, in which case the generic clutch becomes also specifically a ground clutch which is one form of brake or lock. If the clutch prevents relative rotation between the two members in one sense but permits relative rotation in the opposite sense, then the clutch is a one-way clutch or ratchet device, which is a subgeneric term designating any device between two relatively rotatable members which permits the first member to rotate in one sense with respect to the second member but prevents the first member from rotating in the opposite sense in respect to the second member. If the first member tends to rotate in the opposite sense with respect to the second member, the one-way clutch engages to lock the two members together. This device is sometimes called a freewheeler. If both members are rotatable absolutely, the freewheeler is a one-way drive clutch. If one of the members cannot rotate, the freewheeler becomes a one-way ground clutch or a one-way brake, a term used herein to denote a species of one-way clutch. This nomenclature is used to avoid the confusion sometimes encountered in definitions of brakes and clutches and is particularly important in this case because a single device is sometimes a one-way drive clutch and at other times a one-way ground clutch or brake.

In the structure just described the freewheelers 62—64—65 and 66—68—70 are both generically one-way clutches. One of them is also specifically at times a brake and at other times a drive clutch. Both freewheelers always function as the species designated by the term one-way ground clutch or brake when the forward brake 72 is held because then neither the race 62 nor the race 66 can rotate backward. However, when the forward brake 72 is released and the reverse brake 38 is set, the ring gear 58 drives the sun gear 60 backward through the freewheeler 62—64—65 which then functions as a one-way drive clutch but not as a one-way brake.

*Operation of the general arrangement*

Assume that the input shaft 10 is driven by the engine of an automobile whose propeller shaft is the final drive shaft 16, that the neutral clutch 11 is engaged and that the car is at rest. For forward drive the brake 72 is set, reverse brake 38 being released. On starting, the inertia of the car holds the carriers 40 and 42 and the turbine $T_3$ stationary. Liquid from the impeller I, rotated at suitable speed, exerts torque on $T_1$ to drive the rear input sun gear 35 forward. Since the rear carrier is momentarily held stationary the rear planet gears 46 attempt to drive the rear reaction ring gear 58 backward. This is prevented by the brake 72 and the two one-way brakes 70—68—66 and 65—64—62. Consequently, the ring gear 58 acts as a reaction gear and the planet gears 46 driven by the sun gear 35 walk around inside the ring gear to rotate the carrier 42 and the output shaft 16 forward slower than the sun gear, thus multiplying the torque supplied by the turbine $T_1$. This motion also positively drives the turbine $T_3$ forward regardless of the hydraulic torque conditions in the torque converter. It will be observed that $T_1$ while exerting its positive drive necessarily runs faster than the output shaft 16 and the turbine $T_3$ by an amount represented by the ratio of the rear planetary gear 35—46—58.

At the same time liquid flowing from $T_1$ to $T_2$ exerts torque on $T_2$ which through shaft 36 drives the front ring gear 37 forward tending to rotate front planet gears 44 forward and, when ring 37 rotates fast enough, (that is, at the speed of output shaft 16 multiplied by the ratio of the planetary gear 37—44—60) tending to rotate the front reaction sun gear backward. This is prevented by the rear one-way brake 70—68—66 which has previously been locked by the rear reaction ring gear 58. Consequently, the front ring gear 37 adds the torque of $T_2$ multiplied by the ratio of the front planetary unit 60—44—37 to the transmission output shaft 16 by walking the front planetary gears 44 around the front reaction sun gear 60 and exerting positive torque to assist in driving the carrier 40 at the speed which $T_1$ is driving carrier 42.

On starting the car, and below some definite speed depending on the design of the blades of the torque converter, the 3rd turbine $T_3$ may not exert any positive or forward torque derived from hydraulic action but, as previously stated, it is positively driven by the carriers 40, 42. However, at some definite speed ratio of input shaft to output shaft, positive hydraulic torque is impressed on $T_3$ and its speed due to hydraulic action tends to exceed the speed of the carriers driven by the other turbines. At this point $T_3$ assists in driving the car by positive or forward torque exerted on the main drive shaft 39—16.

As the speed of the car progressively increases from standstill two things happen successively. First, the torque delivered to the output shaft by $T_1$ through the rear planetary unit drops to a vanishing point as $T_1$ reaches its terminal speed. When the speed of $T_1$ multiplied by the ratio of the rear planetary unit becomes less than the speed of $T_2$ multiplied by the ratio of the front planetary unit, the second turbine $T_2$ and the third turbine $T_3$ are driving the carriers faster than $T_1$ can drive them and the front freewheeler 65—64—62 breaks away, reaction gear 58 is rotated forward by the planet gears 46, and $T_1$ idles in the stream of circulating oil, neither absorbing nor delivering appreciable torque. $T_2$ is now driving the car, assisted by $T_3$. Second, upon further increase in the speed of the car $T_2$ reaches its terminal speed and can no longer drive the carriers 40—42 through the front planetary gear set as fast as $T_3$ which is directly connected to the carriers. At this point the rear freewheeler 70—68—66 breaks away, the front sun gear 60 is turned forward by the planet gears 44 and $T_2$ idles in the stream of liquid.

For reverse drive the forward brake 72 is released and reverse brake 33 is set to hold the front ring gear 37 to act as a reaction gear. This also holds $T_2$ stationary during all reverse drive. Now $T_1$ drives rear input sun gear 35 forward which (because the carrier 42 is initially held by the stationary car) drives the ring gear 58 backward, which through the front one-way clutch 62—64—65 tends to drive the front sun gear 60 backward. This is permitted, in fact, for although the other one-way brake 70—68—66 tends to lock, its inner race 70 can turn backward, being unopposed by the brake 72. Consequently, the front freewheeler 62—64—65 acts as a driving clutch for the front sun gear 60 which, rotating backward, walks the front planet gear 74 backward around the stationary ring gear 37. Thus, the carrier 40 is rotated slowly backward driving the car backward and carrying the turbine $T_3$ positively backward. In fact, it is possible depending on blade design for the turbine $T_3$ to have reverse torque impressed on it hydraulically, in which case it will assist in driving the car backward. The turbine $T_2$ being held stationary can act as a guide wheel or reaction member directing oil from $T_1$ to the front sides of the $T_3$ blades.

The stator is mounted on a suitable support 86 having any known one-way brake represented by the ratchet members 88 secured to the support 86 and overlapping a stationary member 90 so as to permit forward rotation but prevent backward rotation as is known. In order to provide different ranges of torque multiplication for varying driving conditions we make the angles of the reaction blades adjustable by mounting each blade on a crank shaft 92 which can be positioned to hold the blade in the desired angle, preferably by the structure and control apparatus described below.

*Structural arrangement*

Figs. 2, 2A and 3 illustrate one form of actual structure embodying the invention and including the elements and their method of operation disclosed schematically above.

In Fig. 2 the engine shaft 10 is secured to a flwheel 100 which is bolted to a torque converter casing including an outer shell 102 and a front cover 104. The impeller blades 20 are supported between an outer shell 106 and an inner shroud 108. At its center edge the impeller shell 106 is riveted to a quarter toroidal shell 110, the outer edge of which is formed into one member of the neutral clutch 11. The impeller member of the clutch 11 includes a cylindrical surface 112 and a frusto-conical surface 114, both formed in the shell or casing 102 and mating with corresponding cylindrical and frusto-conical surfaces 116 and 118, respectively, formed in the shell 110. The space 120 between the torque converter shell 102 and the clutch shell 110 constitutes the chamber of an expansible chamber motor by which the clutch may be held disengaged when fluid under pressure is supplied to it, as will be explained, against the engaging pressure of working liquid within the converter.

The cylindrical surfaces 112 and 116 form a seal which effectively prevents leakage from the chamber 120 when the latter is filled. The conical surfaces 114 and 118 form the active friction surfaces of the clutch. If it is necessary to allow oil to escape from the pocket in the clutch when the clutch is being engaged, openings 122 may be provided or the clutch surfaces may be grooved.

The converter shell 102 is secured to a tubular shaft 124 which drives any suitable oil pump 126, herein called the front pump, enclosed in part of the stationary transmission casing 128. The shaft 124 is suitably sealed to the casing to prevent leakage of oil. The front part of the tube 124 has a passage 130 leading from the chamber 120 to a space 132 provided between the tube 124 and an inner tubular shaft 134 (which is part of the stator support 86 of Fig. 1). These openings 130 and 132 constitute a passage for supplying fluid under pressure to the chamber 120 to release the clutch 11.

The blades 24 of the first turbine $T_1$ are secured to an outer shell 136 fastened to a flange 138, fastened at its center to a hub 140 splined to innermost shaft 34 which drives the rear sun gear 35 shown in Fig. 1 and 2A. The hub 140 radially supports the front end of the shaft 34 and is itself supported for rotation by suitable bearings in a cap 142 forming part of the front cover 104. The cap 142 is supported in a bore in the engine shaft 10 and completes the closed chamber of the torque converter formed by the shell 102 and cover 104. The cover 104 may carry on its inner face a number of radial vanes 144 which rotate the liquid in the space between the cover 104 and the first turbine flange 138 at the same speed that the liquid is rotating within the working space of the torque converter. This creates outside of the first turbine flange 138 a static hydraulic pressure which balances that within the torque converter. The hub 140 has openings 146 for supplying working liquid, preferably oil, to the torque converter from a passage 148 in the shaft 34 to which the control system described below supplies oil under pressure.

The blades of the second turbine $T_2$ are secured to a shroud 150 fixed to a spider 152 riveted to a flange or hub 154 secured to the front end of shaft 36, the other end of which is splined to a drum 156 (Fig. 2A), preferably formed integral with the ring gear 37 which is schematically illustrated in Fig. 1. The ring gear 37 is provided with splines 158 by which the drum and ring gear are slidably but non-rotatably connected to cone 38, which is the brake 38 schematically represented in Fig. 1. The cone 38 may be held fast to the casing when gripped between the stationary cone 160 and a non-rotatable but slidable cone 162 formed on a piston 164 slidable in a cylinder 38a, which is the pressure chamber 38a in Fig. 1. Fluid under pressure, when admitted to this chamber, urges the piston to the right as Fig. 2A is seen to engage the reverse brake. The piston 164 is constantly urged away from the cone 160 to disengage the brake by a return spring 166. The cylinder 38a may be formed as an annular groove in a reaction flange 168 secured to the stationary casing 130.

The third turbine $T_3$ includes an outer shell 170 and an inner shroud 172 between which the blades 28 are fixed. The outer shell 170 is riveted to a hub or flange 174 secured to the front end of the hollow main shaft 39 which shaft is splined at its rear end (Fig. 2A) to carriers 40 and 42 of both planetary gear units and is thereby connected to the transmission output shaft 16.

As shown in Fig. 2A the rear end of shaft 34 is supported for rotation in a radial bearing in a bore in the end of transmission output shaft 16. The shaft 34 is splined to the sun gear 35. The rear carrier 42 is formed by a front flange 180 integral with a sleeve 181 splined to the rear end of the main shaft 39, planetary spindles 182 and a rear flange 184 splined to flange 186 formed integral with the output shaft 16. The carrier 40 of the front planetary unit in Fig. 1 is formed as shown in Fig. 2A, including front flange 188 splined to the sleeve 181, planetary spindles 190 and rear flange 192. The rear carrier spindles 182 support the planetary gears 46 which mesh with the rear input sun gear 35 and with the rear reaction ring gear 58. This ring gear is formed on a drum 61 splined to a flange 194 formed integral with a sleeve 196 supported for rotation through any suitable bearings on the output shaft 16. The flange 194 is riveted to the outer race 62 which is the member 62 in Fig. 1 and forms the outer race of the front freewheeler 62—64—65. This freewheeler has any suitable sprags or rollers 64 (which are the actual form of the ratchet members 64 schematically shown in Fig. 1) bearing on the inner race 65 which is a cylinder formed integral with a flange 198 which is riveted to a race 66 which is the member 66 in Fig. 1 and forms the outer race of the rear freewheeler 66—68—70. The rear freewheeler has its ratchet members 68 in the form of sprags or rollers which bear on the inner race 70 which is the member 70 in Fig. 1. The flange 198 is splined to the drum 76 which is in turn splined to the front sun gear 60, which is supported for rotation on the sleeve 181. The race 70 is splined to the flange 78 which carries the cone 72 of the forward brake shown diagrammatically in Fig. 1. The races 65 and 70 are supported for rotation by suitable bearings on the sleeve 196. The brake drum 72 can be held fast by being pressed between a stationary cone 200 and a non-rotatable but slidable inner cone 202 carried on or forming part of a piston 204 doweled to the stationary cylinder 74, which is the cylinder 74 of Fig. 1. The piston is normally held to the right as Fig. 2A is seen to hold the cones 72, 200 and 202 out of engagement by any suitable return spring not shown. When the brake 72 is set by fluid pressure admitted to the cylinder 74 by controls which will be explained, the ring gear 58 is held against reverse rotation, as explained in connection with Fig. 1. This prevents the reaction ring gear 58 and the reaction sun gear 60 from turning backward. When the brake 72 is released, it permits the ring gear 58 to drive the sun gear 60 backward when the transmission is set for reverse.

The transmission may include any suitable parking lock for positively locking the shaft 16 against rotation, as is known.

Referring to Figs. 1 and 3 the reaction guide wheel or stator R includes a blade support generally designated by 210 and a shroud 212 between which the blades 30 are mounted on the spindles or crank shafts 92. The stator support 210 is rotatable about the axis of the transmission but only forward, as is known. The support 210 has an outer cylindrical wall 214 jointed to an inner cylindrical wall 216 by a thick annular or radial wall 218 to form an open-ended annular cylinder 220. The radial wall 218 is secured to or forms part of the sleeve or tubular shaft 134 which is part of the stator support 86 of Fig. 1 and is supported for rotation by suitable bearings on the $T_2$ shaft 36.

As shown in Fig. 2A the right-hand end of the stator support sleeve 134 is splined to a flange 222 to the outer circumference of which is secured the outer race 224 of any suitable freewheeler having sprags or rollers 88 which are the ratchet members 88 schematically illustrated in Fig. 1 and which run on the inner race 90 which is the member 90 diagrammatically illustrated in Fig. 1 and is fixed to the reaction flange 168 secured to the casing 130. The tube 134, flange 222 and race 224 collectively correspond to the member 86 of Fig. 1. The freewheeler 224—88—90 permits this whole stator assembly to rotate forward and prevents its reverse rotation.

As shown best in Fig. 3 each crank pin 92 has a crank arm 226 in an annular groove 228 in an annular piston 230 which slides in the annular cylinder 220 and divides the cylinder into two variable volume pressure chambers 232 and 234, each of which forms, with piston 230, a separate fluid pressure motor or expansible chamber motor for positioning the piston and therefore the stator blades. The high angle holding chamber 234 is constantly open to the torque converter so that converter pressure in this chamber always urges the piston toward the right, which is the position of highest blade angle which is the same as lowest blade pitch. In this angle the blades make the greatest change of direction of oil flowing from the turbine $T_3$ to the impeller I through the working circuit and thus provide the greatest range of torque multiplication. The piston 230 can be held against movement to the right, or can be positively moved to the left against the pressure in the chamber 234 by the total of leftward forces acting on the piston which forces include variable pressure in low angle holding chamber 232 and the hydrodynamic force, if any, on the blades 30, as will be explained. In the particular modification of the invention illustrated, oil is supplied to the low angle holding chamber 232 from the high angle holding chamber 234 through a restricted, or slow flow, passage 238 with the result that pressure in chamber 232 can never exceed pressure in chamber 234. Therefore pressure in the chamber 232 alone can stop movement of the piston to the right but this pressure alone can never move the piston to the left. Where the chamber 232 derives its pressure from chamber 234 we prefer to construct the stator so that blades 30 have a larger area on the down stream side of the shafts 92 than on the upstream side, the downstream side being the right hand side of the shaft 92, as seen in Fig. 3. Consequently, the hydraulic force of oil circulating in the torque converter constantly urges the blades to low angle, that is urges the piston to the left. The apparatus is so proportioned that when there is no pressure in the low angle chamber 232 the pressure maintained by the converter in the high angle chamber 234 is sufficient to overcome the hydrodynamic force on the blades 30 and move the blades 30 to their highest angle and this can occur throughout the entire operating range of the torque converter.

The low angle chamber 232 forms with the piston 230 an expansible chamber motor for opposing movement of the piston to the right and consequently movement of the blades toward high angle. The low angle chamber 232, piston 230, cranks 226, shafts 92, blades 30 and oil circulating through the stator together form means for positively moving the blades to low angle against the force of pressure in high angle chamber 234. At some value of pressure in low angle chamber 232 less than the pressure in high angle chamber 234, the force on the piston 230 of the pressure in low angle chamber 232, plus the hydraulic force on the blades 30 equals the force on the piston of pressure in high angle chamber 234 and this holds the blades in one particular position.

Whenever the pressure in low angle chamber 232 is reduced the converter pressure in high angle chamber 234 moves the piston to the right and increases the angle of the blades. Conversely, whenever the pressure in low angle chamber 232 is thereafter increased, so as to approach the pressure in high angle chamber 234, the piston 230 is moved positively to the left to decrease the angle of the blades. The pressure in low angle chamber 232 may be controlled by a vent tube 240 axially slidable in a bore 241 in the thick radial wall 218 closed at its end and isolated from the converter pressure by a plug 241a. The tube 240 forms a movable inlet for an exhaust conduit including a passage 242 formed in the wall 218 and communicating with an opening 244 in the second turbine output shaft 36 which communicates with the space 246 between the shaft 36 and the third turbine shaft 39, which near the right-hand end of shaft 36, as shown in Fig. 2A, communicates with an opening 248 in shaft 36 which communicates with space 250 between the shaft 36 and stator support shaft 134 which space communicates through an opening 252 in shaft 134 to vent passage 254. The conduit formed by the tube 240, passage 242, opening 244, space 246, opening 248, space 250, opening 252 and passage 254 forms a vent for the chamber 232. The space 250 is isolated from other control passages by suitable seals 256. Whenever the low angle chamber 232 is vented the piston moves toward the right until it strikes the end of the tube 240 and this closes the vent. In order to close the vent effectively the end of the tube 240 is provided with a suitable gasket 258.

The invention includes means for positioning the vent tube 240 so as to place and hold the stator blades in any desired angle automatically in accordance with operating conditions. The tube 240 is constantly urged to the left by a spring 260 and may be urged to the right against the force of the spring by pressure in an expansible chamber 262 formed between the tube 240 and the portions of large and small diameters of the bore 241. The pressure existing in the chamber 262 (which we call the throttle control chamber) determines the normal, or free, position of the tube 240 against the force of the spring 260 and this in turn determines the position of the stator blades as will now be explained.

Suppose that the pressure in chambers 232 and 234 has been equalized, that there is no pressure in throttle control chamber 262 and that the piston is moved against the stop ring 263 by the hydraulic force on the blades 30. The blades are now at lowest angle. The spring 260 presses the tube 240 as far as it will go to the left, that is until the gasket 258 is against the piston. This closes the vent from the low angle chamber 232 and permits the pressure to remain the same as the pressure in chamber 234. If it is desired to increase the angle of the stator blades fluid under pressure is admitted to the throttle control chamber 262 through a conduit which includes passage 264 in the wall 218 which communicates with the space 266 between tubular shafts 36 and 134 and with opening 267 in shaft 134 which opening leads to control passage 268 shown in Figs. 2A and 4. This pressure positively moves the vent tube 240 to the right against the spring 260 and at some particular value of pressure holds the tube 240 in the position shown in Fig. 3, for example. This allows oil to flow from the chamber 232 faster than it can be supplied through the passage 238 in the piston and this vents the low angle holding chamber 232 or reduces its pressure so that pressure in the high angle chamber 234 moves the piston 230 to the right as fast as the outflow of oil from chamber 232 will permit, until the piston again meets the gasket 258. This closes the inlet of the exhaust conduit, that is closes the vent from the low angle holding chamber 232 and stops further flow of oil from that chamber 232 and this holds the piston against the tube 240 as shown in Fig. 3.

Maintaining the piston in any particular position requires maintaining the pressure in low angle chamber 232 at value which exerts a leftward force on piston 230, which force combined with the leftward force exerted by the blades due to the circulating oil, just balances the force of pressure in high angle chamber 234, after the blades have been moved to the desired position. Where the blades have an area downstream of their pivots greater than the area upstream of the pivots, we maintain the pressure in the low angle chamber 232 at a sufficient value below the pressure in the converter so that the force on the right-hand side of the piston due to the pressure in chamber 232, plus the hydrodynamic force on the blades 30 just balances the force of converter pressure on the left of the piston. The hydrodynamic force on the blades 30 depends upon the angle of blades, the speed of rotation of the pump, and other factors as is known.

As the vent into tube 240 is closed by the piston, oil flowing into the low angle chamber 232 through opening 238 in the piston begins to increase the pressure in chamber 232 toward the value of converter pressure. When the sum of the force of the pressure in low angle chamber 232 on piston 230 and the hydrodynamic force on the blades 30 exceeds the force of pressure in the high angle chamber 234 on the piston, the piston will move away from the tube 240 which remains held by the spring 260 and pressure in throttle control chamber 262. This slightly opens the vent which then again reduces the pressure in chamber 232 and permits the converter pressure to return the piston to its position against the gasket 258. The piston thus hunts or hovers in a narrow range of movement between complete closing and slight opening of the vent tube 240 and this holds the stator blades 30 in a position determined by the tube 240 which, as previously explained, is determined by the pressure in chamber 262. In order to increase the angle of the blades 30 and thereby increase the performance or range of torque multiplication of the torque converter we merely increase pressure in throttle control chamber 262 in any suitable manner and conversely to decrease the stator blade angles we reduce the pressure in this chamber. This can be done either manually at the will of the driver of the car or automatically in accordance with driving conditions, for example by means of the control system illustrated in Fig. 4. When the pressure in throttle control chamber 262 is reduced, the force urging the tube 240 to the right is correspondingly reduced. When the pressure in chambers 232 and 234 become nearly equalized, and the piston starts to move to the left under the hydraulic force on the blades, as explained above, the spring 260 can now hold the vent tube 240 against the piston 230. Consequently, the vent tube follows the piston as it moves toward low blade angle position, until the piston and vent tube 240 reach a position at which the reduced pressure in the throttle control chamber 262 will balance the spring 260. Thereafter slight movement of the piston to the left will open the end of vent tube 240 and the piston will now hover or hunt, as described above, to regulate the pressure in chamber 232 to hold the blades at a low angle measured by the pressure in the throttle control chamber.

Control system

The structure described above can be operated by any suitable controls which select forward, neutral and reverse and which place the stator blades in the desired position either manually or automatically but we prefer to place the stator blades continuously in position according to the torque or power demand on the engine.

Referring to Fig. 4, the front pump 126, when the engine is running, constitutes a source of fluid under pressure for operating the control system. This may be of any suitable known type and is designed to maintain a constant pressure, which pressure may, however, be adjusted or modulated with changes of torque demand on the engine by suitable known controls. In addition a rear pump 270 suitably driven by the output shaft 16, as is known, maintains pressure when the car is running forward. Both pumps take in oil from a common intake or sump 272 and their outlets 274 and 276 discharge to a common outlet 278 which leads to the main hydraulic control line 280 through a regulated pressure chamber 282 in a pressure regulator valve generally denoted by 284. The front pump is connected to the common outlet 278 through a check valve 286 and the rear pump is connected to the common outlet 278 through a check valve 288 so that when one pump is not operating the other pump can supply oil to the system and will not be vented through the idle pump.

The pressure regulator valve includes a valve stem 290 constantly urged to the left by a spring 292 which acts on the stem 290 through a pin 294 sliding in a stationary support 295, against the force of pressure in a regulating chamber 296 which is connected to the common pump outlet 278. Pressure in the regulating chamber 296 urges the valve stem to the right with a force which is proportional to the pressure in the main line 280. The front pump outlet 274 is also connected to a pump selector chamber 298 by a passage 300 independent of the check valves. When the pressure of oil from both pumps reaches a predetermined value, which can occur when the engine is running and the car has reached a predetermined speed, the valve stem 290 has moved to the right far enough to permit a land 302 to connect the pump selector chamber 298 with a venting chamber 304 which is connected to the sump 272 through a cooler 306 in parallel with any known pressure-responsive by-pass valve 307. When this occurs the front pump is vented to the sump and this reduces the pressure maintained by the front pump thus reducing the load on the engine and permitting the rear pump to supply the requirements of the system through check valve 288, the check valve 286 being closed. The pressure regulator valve tends to maintain a constant pressure in the line 280, as is known. If the pressure tends to increase above a predetermined maximum, the stem 290 moves to the right far enough to permit a land 308 to vent the regulated pressure chamber 282 through the pump selector chamber 298 which has previously been connected to vent chamber 304 by the land 302. If the pressure tends to decrease below a predetermined minimum, the stem 290 moves to the left until land 302 closes the vent 304.

The pressure maintained in the line 280 may be reduced below the value otherwise maintained by the regulator 284, in response to low torque demand on the engine by any suitable torque demand responsive regulator valve, for example the vacuum modulator valve generally denoted by 310. This includes a modulated pressure chamber 312 to which oil is admitted from the main line 280 and from which oil is vented by an exhaust port 314 under control of a valve stem 316 positioned in response to the balance of force in one direction of pressure in a modulating chamber 318 connected to the modulated pressure chamber 312 and the force in the opposite direction of a spring 320 as modified by the pressure in the intake manifold 322 of the engine which drives the car communicated to a chamber 324 surrounding the spring and closed by a flexible diaphragm 326 exposed to the atmosphere. The modulated pressure chamber 312 is connected to a modulating chamber 328 in the regulator valve 284 where the pressure of the chamber 328 assists the spring 292 to increase the pressure maintained in main line 280. Whenever the torque demand on the engine is low, the absolute pressure in the manifold is low (vacuum is high) and this reduces the force of spring 320 on valve stem 316 which reduces the pressure in chambers 312 and 328 which reduces the pressure of the main line 280. Thus main line pressure is maintained as a function of torque demand in the manner and for the purposes which are known.

Oil may be supplied to the converter from the main line 280 through a restriction 330 and may be exhausted from the converter to lubricate the transmission through a pressure-responsive relief valve 332 (shown structurally in Fig. 2) so that the converter pressure may be maintained at any desired value customarily below that maintained in the main line 280, for example 30 pounds per square inch.

A manual selector valve 340 is supplied with oil from the main line 280 at its inlet 342. The valve is shown in the forward drive position in which oil is supplied to the pressure chamber 74 of the forward clutch through the space between lands 344 and 346 and oil is supplied to a stator control valve 348, which will be explained. In this position of the manual valve the neutral clutch release chamber 120 is vented through the open bore of the manual valve to the left of land 346 permitting converter pressure to engage the neutral clutch 11. The reverse clutch cylinder 38a is vented through the open end of the manual valve 340 adjacent land 344.

The main line 280 is connected to a stator control valve, generally denoted by 348. This includes a valve stem 350 urged to the right, as Fig. 4 is seen, to open an inlet 352 from main line by a spring 354, the force of which is regulated by an arm 356 connected to the throttle of the engine. The valve stem is urged to the left to close the inlet from the main line and open an exhaust port 358 by the force of oil in a regulating chamber 360 connected to a regulated pressure chamber 362 between lands 364 and 366. This arrangement maintains in the regulated pressure chamber 362 a pressure which is a function of throttle opening of the engine and hence a function of torque or power demand on the engine. The regulated pressure chamber 362 is connected to the previously described conduit 268, leading to the throttle control chamber 262 in the stator so that pressure maintained in chamber 262 is a function of torque or power demand on the engine. Thus, the amount by which the outlet tube 240 is held to the right of its extreme leftmost position against the spring 260 is a measure of torque demand on the engine or a measure of throttle position and this accordingly positions the stator blades and determines the range of torque multiplication of the torque converter. A stop 370 prevents the valve stem from blocking the exhaust port 358.

If it is desired to control the stator at the will of the operator and independently of the torque demand on the engine, the arm 356 is not connected to the throttle but is operated whenever desired.

To drive the car backward, the manual valve stem is moved to the right until the land 346 cuts off the forward clutch 74 from the inlet 342 and the land 344 closes the open end of the bore and connects the reverse clutch 38a to the inlet 342. The neutral release clutch remains vented through the open left end of the valve bore.

In this arrangement the stator is controlled in reverse, because the manual valve does not affect the supply of oil to the throttle valve 348. If it is desired to prevent stator control in reverse, and thereby keep the stator in low angle, the inlet 352 of the throttle valve may be connected to the forward clutch 74 instead of to the main line 280.

For neutral, the manual valve stem is moved fully to the left as Fig. 4 is seen, in which position land 346 permits oil to flow from main line 280 to the neutral clutch release servo 120 to release the neutral clutch 11.

Where reference characters appear in claims this is for convenience and illustration only, and we intend the claims to be construed as if there were no reference characters.

We claim:

1. In a hydrodynamic device for transmitting torque from an input member to an output member, in combination, means including a movable adjusting element (30, 92 or 230) for varying the torque transmitted between the input and output members, means (234) for urging the adjusting element toward a first position providing one torque transmitting condition, an expansible chamber (232) for opposing the urging means and holding the adjusting element in positions to provide other torque transmitting conditions, means for supplying to the chamber fluid under pressure sufficient to overcome the urging means, a conduit having a movable inlet for venting the expansible chamber, the device including means for closing the inlet in response to the position of the adjusting element, and means for adjusting the position of the inlet of the venting conduit.

2. In a hydrodynamic device for transmitting torque from an input member to an output member, in combination, means including a movable adjusting element (230) for varying the torque transmitted between the input and output members, means for urging the adjusting element toward a first position providing one torque transmitting condition, an expansible chamber for opposing the urging means and holding the adjusting element in positions to provide other torque transmitting conditions, means for supplying to the chamber fluid under pressure sufficient to overcome the urging means, a conduit having a movable inlet for venting the expansible chamber, the inlet being arranged to be closed by the adjusting element, and means for adjusting the position of the inlet of the venting conduit.

3. In a hydrodynamic device for transmitting torque from an engine to an output member, in combination, means including a movable adjusting element for varying the torque transmitted, means for urging the adjusting element toward a first position providing one torque transmitting condition, an expansible chamber for opposing the urging means and holding the adjusting element in positions to provide other torque transmitting conditions, means for supplying to the chamber fluid under pressure sufficient to overcome the urging means, a conduit having a movable inlet for venting the expansible chamber, the inlet being arranged to be closed in response to the position of the adjusting element, and means for positioning the inlet of the conduit in accordance with the torque demand on the engine.

4. In a hydrodynamic device for transmitting torque from an input member to an output member, in combination, means including a movable adjusting element for varying the torque transmitted between the input and output members, means for urging the adjusting element toward a first position providing one torque transmitting condition, an expansible chamber for opposing the urging means and holding the adjusting element in positions to provide other torque transmitting conditions, means for supplying to the chamber fluid under pressure sufficient to overcome the urging means, a conduit having a movable inlet for venting the expansible chamber, the inlet being arranged to be closed in response to the position of the adjusting element and a second expansible chamber for moving the inlet of the conduit.

5. In a hydrodynamic device for transmitting torque from an input member to an output member, in combination, means including a movable adjusting element for varying the torque transmitted between the input and output members, means for urging the adjusting element toward a first position providing one torque transmitting condition, an expansible chamber for opposing the urging means and holding the adjusting element in positions to provide other torque transmitting conditions, a relatively low-rate supply passage for the expansible chamber, means for continuously supplying to the passage fluid under pressure sufficient to overcome the urging means, a relatively high-rate conduit having a movable inlet and adapted to vent the expansible chamber at a greater rate than the rate of supply, the inlet being arranged to be closed in response to the position of the adjusting element, and means for adjusting the position of the inlet of the venting conduit.

6. In a hydrodynamic device for transmitting torque from an engine controlled by a movable fuel supply member to an output member adapted to drive a load, in combination, means including a movable adjusting element for varying the torque transmitted between the engine and the output member, means for urging the adjusting element toward a first position providing one torque transmitting condition, an expansible chamber for opposing the urging means and holding the adjusting element in positions providing other torque transmitting conditions, means for supplying to the chamber fluid under pressure sufficient to overcome the urging means, a conduit having a movable inlet for venting the expansible chamber, the inlet being arranged to be closed in response to the position of the adjusting element, and means for placing the inlet of the venting conduit in accordance with the position of the fuel supply member.

7. In a hydrodynamic device for transmitting torque from an engine controlled by a movable fuel supply member to an output member adapted to drive a load, in combination, means including a movable adjusting element for varying the torque transmitted between the engine and the output member, means for urging the adjusting element toward a first position providing one torque transmitting condition, an expansible chamber for opposing the urging means and holding the adjusting element in positions providing other torque transmitting conditions, means for supplying to the chamber fluid under pressure sufficient to overcome the urging means, a conduit having a movable inlet for venting the expansible chamber, the inlet being adapted to be closed in response to the position of the adjusting element, a second expansible chamber for determining the position of the inlet of the venting conduit, a source of fluid under pressure adapted to be connected to the second expansible chamber, and means responsive to the torque demand on the engine for determining the pressure in the second expansible chamber and thereby determining the position of the inlet of the venting conduit.

8. In a hydrodynamic device for transmitting torque from an engine controlled by a movable fuel supply member to an output member adapted to drive a load, in combination, means including a movable adjusting element for varying the torque transmitted between the engine and the output member, means for urging the adjusting element toward a first position providing one torque transmitting condition, an expansible chamber for opposing the urging means and holding the adjusting element in positions providing other torque transmitting conditions, means for supplying to the chamber fluid under pressure sufficient to overcome the urging means, a conduit having a movable inlet for venting the expansible chamber, the inlet being adapted to be closed in response to the position of the adjusting element, a second expansible chamber for determining the position of the inlet of the venting conduit, a source of fluid under pressure for the second expansible chamber, and means responsive to the position of the fuel supply member for determining the pressure in the second expansible chamber and thereby determining the position of the inlet of the venting conduit.

9. In a hydrodynamic device for transmitting torque from an engine controlled by a movable fuel supply member to an output member adapted to drive a load, in combination, means including a movable adjusting element for varying the torque transmitted between the engine and the output member, means for urging the adjusting element toward a first position providing one torque transmitting condition, an expansible chamber for opposing the urging means and holding the adjusting element in positions providing other torque transmitting conditions, means for supplying to the chamber fluid under pressure sufficient to overcome the urging means, a conduit having a movable inlet for venting the expansible chamber, the inlet being adapted to be closed by the adjusting element, means for urging the inlet in one direction, a second expansible chamber for urging the inlet in the opposite direction, a source of fluid under pressure for the second expansible chamber, and means responsive to the torque demand on the engine for determining the pressure in the second expansible chamber and thereby determining the position of the inlet of the venting conduit.

10. In a hydrodynamic device for transmitting torque from an input member to an output member, in combination, means including a movable adjusting element (30 or 92) for varying the torque transmitted between the input and output members, means for urging the adjusting element toward a first position providing one torque transmitting condition, an expansible chamber having a movable wall (230) for opposing the urging means and holding the adjusting element in positions providing other torque transmitting conditions, means for supplying to the chamber fluid under pressure sufficient to overcome the urging means, a vent conduit having a movable inlet member having a passage, the inlet member being disposed in said expansible chamber so that its passage can be closed by said movable wall, means constantly urging the inlet member toward the movable wall, and a second expansible chamber for urging the inlet member away from the movable wall.

11. In a hydrodynamic device for transmitting torque from an input member to an output member, in combination, means including a movable adjusting element for varying the torque transmitted between the input and output members, means for urging the adjusting element toward a first position providing one torque transmitting condition, an expansible chamber having a movable wall for opposing the urging means and holding the adjusting element in positions providing other torque transmitting conditions, means for supplying to the chamber fluid under pressure sufficient to overcome the urging means, a vent conduit having a movable inlet member having a passage, the inlet member being disposed in said expansible chamber so that its passage can be closed by said movable wall, means constantly urging the inlet member in one direction with respect to the movable wall, and a second expansible chamber for urging the inlet member in the opposite direction with respect to the movable wall.

12. In a hydrodynamic device for transmitting torque from an input member to an output member, in combination, means including a movable adjusting element for varying the torque transmitted between the input and output members, means for urging the adjusting element toward a first position providing one torque transmitting condition, an expansible chamber having a movable wall for opposing the urging means and holding the adjusting element in positions providing other torque transmitting conditions, means for supplying to the chamber fluid under pressure sufficient to overcome the urging means, a vent conduit having a movable inlet member having a passage, the inlet member being disposed in said expansible chamber so that its passage can be closed by said movable wall, means constantly urging the inlet member toward the movable wall, a second expansible chamber for urging the inlet member away from the movable wall and means for supplying fluid at a variable pressure to the second expansible chamber to determine the position of the adjusting element.

13. Apparatus as defined in claim 1 in which the device for transmitting torque has a reaction element mounted on a rotatable support, and the adjusting element, the expansible chamber and the inlet of the conduit for venting the expansible chamber are disposed in said rotatable support.

14. Means for positioning the blades of a hydrokinetic torque transmitting device comprising in combination, a movable piston for positioning the blades, a first expansible chamber (234) on one side of the piston, means continuously supplying fluid under pressure to the first chamber to urge the blades toward one position, a second expansible chamber (232) on the other side of the piston, means for continuously supplying liquid under pressure to the second chamber to oppose movement of the piston which movement tends to place the blades in said one position, and a vent conduit for the second chamber, said vent conduit having an inlet which is movable with respect to the piston, and said inlet and said piston being structurally so related to each other that the inlet can be closed by the piston as it moves toward said one position.

References Cited in the file of this patent

UNITED STATES PATENTS 2,178,356     Brunner     Oct. 31, 1939

FOREIGN PATENTS 444,171     Great Britain     Mar. 16, 1936